> United States Patent Office 3,763,075
Patented Oct. 2, 1973

3,763,075
IMIDE-AMIDE COPOLYMERS AND METHOD
OF MAKING SAME
Friedrich Grundschober, Onex, and Joerg Sambeth,
Carouge, Switzerland, assignors to Rhone-Poulenc-
Textile, Lyon, France
No Drawing. Continuation-in-part of abandoned application Ser. No. 707,434, Feb. 2, 1968. This application Mar. 6, 1972, Ser. No. 232,263
Int. Cl. C08g 20/32
U.S. Cl. 260—30.2 T  28 Claims

ABSTRACT OF THE DISCLOSURE

Imide-amide copolymer in solution is prepared by causing a linear or cross-linked polyamide-imide in solution to react with a linear or cross-linked polyimide in solution, the proportion of both reactants being such that the copolymer contains from 10 to 90 percent of tetracarbonyl recurring units based on the total number of tricarbonyl and tetracarbonyl recurring units. This copolymer may be linear or cross-linked and, in both cases, is soluble in the form of high molecular weight macromolecules. From the solutions of this copolymer, films may be prepared, that are highly resistant to heat and exhibit a good flexibility.

CROSS REFERENCE TO RELATED APPLICATION

This is a continuation-in-part of copending application Ser. No. 707,434 filed on Feb. 2, 1968, now abandoned which claims priority of Feb. 25, 1967 based on an application filed in Switzerland.

DETAILED DESCRIPTION

This invention relates to imide-amide copolymers and to a method of making same.

Among the known polymers there is one kind which contains imide groups and another which contains amide-imide groups.

The first kind, i.e. the polyimides, and in particular the aromatic variety, are highly resistant to heat and have good electric and dielectric properties as well as interesting mechanical properties and can be used to form films or thin layers having a protective and insulating function, e.g. on electric conductors. However, these resins are infusible and insoluble and are only soluble in a prepolymer state. This means that a chemical reaction is still required at the time of producing formed bodies, e.g. films, from prepolymer solutions, hence complicating the industrial use of these resins. Moreover, the resultant films are, in some instances, of rather low flexibility and withstand repeated bending rather poorly.

The second kind, i.e. the polyamide-imides, are soluble in some polar organic solvents when they have a high molecular weight polymer, and thus make it easier to produce protective films or layers. Polyamide-imide protective films and layers are generally more flexible than films and thin layers made of polyimides. However, their resistance to heat, in particular their ability to withstand oxidation at high temperature, is generally less than that of polyimides.

An object of the present invention is to provide copolymers of polyimides and polyamide-imides which are soluble in the form of high molecular weight macromolecules, thereby to enable films and protective layers, which combine the high resistance to heat of polyimides and the flexibility of polyamide-imides, to be easily produced.

The invention provides an imide-amide copolymer consisting essentially of the following recurring structural units:

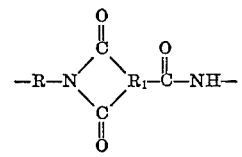

and

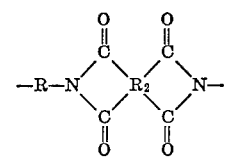

wherein R is a divalent organic radical including at least two carbon atoms selected from the group consisting of an alkyl radical, an aryl radical, a cycloalkyl radical, two cycloalkyl radicals directly bonded to each other, two aryl radicals bonded to each other directly or through one of the following radicals:

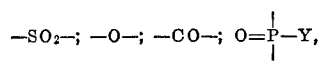

where Y is an alkyl, aryl or cycloalkyl radical or a hydrogen atom, or else through at least one heterocyclic residue containing at least one nitrogen, oxygen or sulfur atom, $R_1$ is a trivalent organic radical including at least three carbon atoms, and $R_2$ is a tetravalent organic radical including at least two carbon atoms, $R_1$ and $R_2$ each being selected from the group consisting of an ethylene radical, an alkyl radical, an aryl radical, a cycloalkyl radical, two aryl radicals bonded to each other directly or through one of the following radicals:

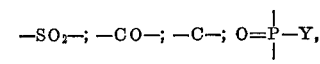

where Y is an alkyl, aryl or cycloalkyl radical or, a hydrogen atom, or else through at least one heterocyclic radical containing at least one nitrogen, oxygen or sulfur atom, said copolymer forming macromolecular arrangements terminated by end groups corresponding to at least one of the following formulae:

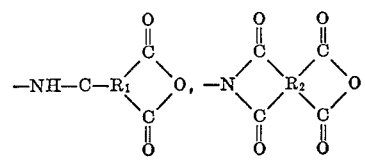

or

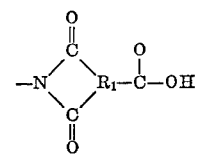

said imide-amide copolymer being in solution in at least one polar organic solvent and wherein the proportion of tetracarbonyl recurring units to tricarbonyl recurring units is from 10 to 90 percent of tetracarbonyl units based on the total number of recurring units.

The invention also provides a cross-linked imide-amide copolymer consisting essentially of the following recurring structural unit

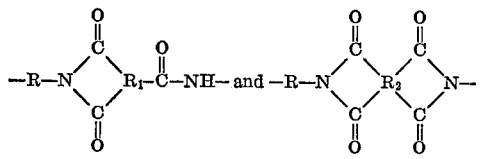

forming linear chains cross-linked through structural units having the formulae:

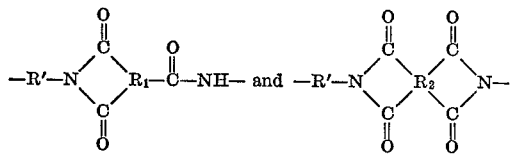

wherein R, $R_1$ and $R_2$ are as defined above and R' is an n-valent organic radical, n being 3 or 4, including at least n carbon atoms, selected from the group consisting of an alkyl radical, an aryl radical, a cycloalkyl radical, or two, three or four aryl radicals bonded to one another directly or through one of the following radicals:

$$-SO_2-;\ -O-;\ -CO-;\ -\underset{|}{\overset{|}{C}}H;$$

$$-O-\underset{\underset{|}{O}}{\overset{\overset{|}{O}}{Si}}-O-;\ O=\underset{\underset{|}{O}}{\overset{\overset{|}{O}}{P}}-O;\ S=\underset{\underset{|}{O}}{\overset{\overset{|}{O}}{P}}-\ \text{and}\ O=\underset{|}{\overset{|}{P}}-$$

said copolymer forming macromolecular arrangements terminated by end groups corresponding to at least one of the following formulae:

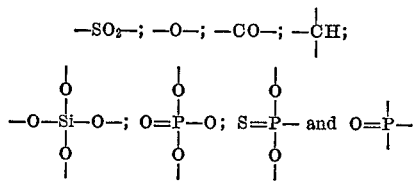

or

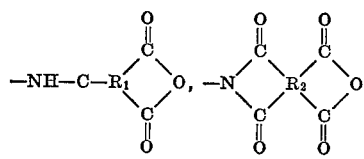

said cross-linked imide-amide copolymer being in solution in at least one polar organic solvent and wherein the proportion of tetracarbonyl recurring units to tricarbonyl recurring units is from 10 to 90 percent of tetracarbonyl units based on the total number of recurring units.

The invention further provides a method of making an imide-amide copolymer, which comprises adding to a product in solution, obtained by reacting, in the presence of at least one polar inert organic solvent, at least one carbonyl compound which is capable of supplying both an amide and an internal imide and which contains a carboxyl group and a pair of carbonyl groups each linked on one side to a distinct carbon atom of one trivalent radical and on the other side to an oxygen atom, the two carbonyl groups being separated by at most three carbon atoms and the carboxyl group being separated from each of the carbonyl groups by at least two carbon atoms, with at least one diisocyanate or a mixture of at least one polyisocyanate and of at least one diisocyanate, the quantities of diisocyanate, of polyisocyanate and of carbonyl compound being such that for each NCO group there is a corresponding ½ mole of carbonyl compound, a product in solution, obtained by reacting, in the presence of at least one polar inert organic solvent, at least one tetracarbonyl compound which is capable of supplying an internal diimide and which contains two pairs of carbonyl groups, each of these groups being linked on one side to a carbon atom of one tetravalent radical and on the other side to an oxygen atom, the carbonyl groups belonging to one pair being separated by at most three carbon atoms, with at least one diisocyanate or a mixture of at least one polyisocyanate with at least one diisocyanate, and/or a mixture of these starting products, the quantities of diisocyanate, of polyisocyanate and of carbonyl compound being such that for each NCO group there is a corresponding ½ mole of carbonyl compound, and which comprises leaving this mixture of products in solution to react at a temperature of less than 100° C. to produce said copolymer in solution, and wherein the total mixture of products in solution contains from 10 to 90 percent of tetracarboxylic compound, based on the total number of moles of tricarboxylic and tetracarboxylic compounds.

Thus, the method according to the invention consists in causing a linear or cross-linked polyamide-imide in solution to react with a linear or cross-linked polyimide in solution.

The preparation of the linear and cross-linked polyamide-imides in solution, used in the method according to the present invention, is, respectively, described in detail in the specifications of our Swiss Pat. No. 453,697 and our Swiss Pat. No. 465,230. That of the linear and cross-linked polyimides in solution is, respectively, described in the specifications of our Swiss Pat. No. 466,924 and our Swiss Pat. No. 472,453.

By way of carbonyl compounds capable of supplying both an internal amide and an internal imide use is preferably made of tricarboxylic acid monoanhydrides, tricarboxylic acids or a mixture of monoanhydride and of a corresponding acid having, respectively, the following general formulae:

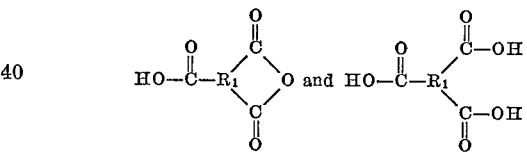

wherein $R_1$ has the same significance as earlier on.

The preferred tricarboxylic acid monoanhydrides are the following:

trimellitic monoanhydride
2,3,6-naphthalene tricarboxylic 2,3-monoanhydride
3,4,4'-diphenyl tricarboxylic 3,4-monoanhydride
1,8,4-naphthalene tricarboxylic 1,8-monoanhydride
1,2,5-naphthalene tricarboxlic 1,2-monoanhydride
3,4,3'-diphenyl sulphone tricarboxylic 3,4-monoanhydride
3,4,9-perylene tricarboxylic 3,4-monoanhydride
3,4,4'-diphenyl ether tricarboxylic 3,4-monoanhydride
tricarballylic monoanhydride
1,2,4-cyclopentadienyl tricarboxylic 1,2-monoanhydride
3,4,4'-benzophenone tricarboxylic 3,4-monoanhydride
2-(3',4'-dicarboxyphenyl)5-(3'-carboxyphenyl)1,3,4-oxadiazole 3',4'-monoanhydride
2-(3',4'-dicarboxyphenyl) 5-carboxybenzimidazole 3',4'-monoanhydride
2-(3',4'-dicarboxyphenyl) 5-carboxybenzoxazole 3',4'-monoanhydride
2-(3',4'-dicarboxyphenyl) 5-carboxybenzothiazole 3',4'-monoanhydride
2-(3',4'-dicarboxydiphenylether) 5-(4-carboxydiphenyl-ether) 1,3,4-oxadiazole 3', 4'-monoanhydride
4'-(3,4-dicarboxyphenyl) carboxymethane monoanhydride
4'-(3,4-dicarboxyphenyl) carboxypropane monoanhydride.

By way of tricarboxylic acids, use is preferably made of the acids corresponding to the above indicated monoanhydrides and, if a mixture of monoanhydride and acid is used, the acid used is the acid corresponding to the monoanhyride.

By way of diisocyanates which are made to react with the above cited carbonyl compounds to produce the polyamide-imides used in the method according to the present invention, use is made of at least one diisocyanate of general formula:

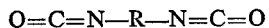

wherein R is a divalent radical, including at least two carbon atoms, which corresponds to the general definition given above.

By way of diisocyanates of the above general formula, use is preferably made of the following isocyanates:

4,4'-diphenyl-2,2-propane diisocyanate
4,4'-diphenylmethane diisocyanate
4,4'-diphenyl diisocyanate
4,4'-diphenylsulphide diisocyanate
4,4'-diphenylsulphone diisocyanate
4,4'-diphenylether diisocyanate
4,4'-diphenyl-1,1-cyclohexane diisocyanate
methyl and bis(meta-phenyl isocyanate) phosphine oxide
1,5-naphthalene diisocyanate
meta-phenylene diisocyanate
tolylene diisocyanate
3,3'-dimethyl diphenyl 4,4'-diisocyanate
3,3'-dimethoxy diphenyl 4,4'-diisocyanate
meta-xylylene diisocyanate
4,4'-dicyclohexylmethane diisocyanate
hexamethylene diisocyanate
dodecamethylene diisocyanate
2,11-dodecane diisocyanate
bis(para-phenylene isocyanate 1,3,4-oxadiazole)para-phenylene
bis(para-phenylene isocyanate), 1,3,4-oxadiazole
bis(meta-phenylene isocyanate)1,3,4-oxadiazole
bis(meta-phenylene isocyanate)4-phenyl 1,2,4-triazole
(2-phenylene)5,4'-benzimidazole diisocyanate
(2-phenylene)5,4'-benzoxazole diisocyanate
(2-phenylene)6,4'-benzothiazole diisocyanate
2,5-bis(2-phenylene isocyanate benzimidazole-6-ene) 1,3,4-oxadiazole
bis(para-phenylene isocyanate-2-benzimidazole-6-ene)
bis(para-phenylene isocyanate-2-benzoxazole-6-ene).

The polyisocyanates that can be used mixed with the diisocyanate(s), are of general formula $$R'(-N=C=O)_n$$

wherein $n$ is 3 or 4, R' being an n-valent organic radical including at least $n$ carbon atoms, selected from the group consisting of an alkyl radical, an aryl radical, a cycloalkyl radical, or two, three or four aryl radicals bonded to one another directly or through one of the following radicals:

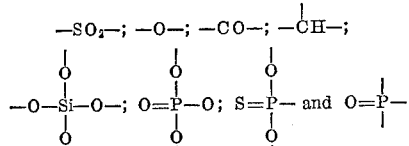

The preferred polyisocyanates are triisocyanates, in particular:

triphenyl methane 4,4',4''-triisocyanate
diphenyl ether 2,4,4'-triisocyanate
triphenyl phosphate 4,4',4''-triisocyanate
triphenyl thiophosphate 4,4',4''-triisocyanate
triphenyl phosphine 4,4',4''-oxide triisocyanate
1-methylbenzene 2,4,6-triisocyanate
1,3,5-methylbenzene 2,4,6-triisocyanate
naphtalene 1,3,7-triisocyanate
diphenyl 2,4,4'-triisocyanate
3-methyl diphenyl methane 2,4,4'-triisocyanate Use can also be made of other polyisocyanates, such as for instance, 4,4'-dimethyl diphenyl methane 2,2',5,5'-tetraisocyanate tetraphenylsilicate tetraisocyanate, a polyphenylene polymethylene polyisocyanate and a polyoxyphenylene polyisocyanate.

By way of tetracarbonyl compounds capable of supplying an internal diimide, use is made of tetracarboxylic acid dianhydrides, tetracarboxylic acids or mixtures of a dianhydride and of an acid having respectively the following general formulae

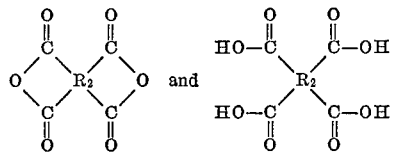

wherein $R_2$ has the same significance as earlier on.

The preferred carbonyl compounds corresponding to either of the above formulae are those where $R_2$ includes several of the above cited groups, these being linked either directly or by at least one of the link radicals given for $R_1$.

By way of dianhydrides, the following are therefore used:

pyromellitic dianhydride
2,3,6,7-naphthalene tetracarboxylic dianhydride
3,3',4,4'-diphenyl tetracarboxylic dianhydride
1,4,5,8-naphthalene tetracarboxylic dianhydride
1,2,5,6-naphthalene tetracarboxylic dianhydride
bis(3,4-dicarboxyphenyl) sulphone dianhydride
3,4,9,10-perylene tetracarboxylic dianhydride
bis(3,4-dicarboxyphenyl) ether dianhydride
ethylene tetracarboxylic dianhydride
cyclopentadienyl tetracarboxylic dianhydride
3,4,3',4'-benzophenone tetracarboxylic dianhydride
bis 2,5-(3',4'-dicarboxyphenyl)1,3,4-oxadiazole dianhydride
bis(3',4'-dicarboxyphenyl 1,3,4-oxadiazole) para-phenylene dianhydride
2-(3',4'-dicarboxyphenyl) 5,6-dicarboxybenzimidazole dianhydride
2-(3',4'-dicarboxyphenyl) 5,6-dicarboxybenzoxazole dianhydride
2-(3',4'-dicarboxyphenyl) 5,6-dicarboxybenzothiazole dianhydride
bis 2,5-(3',4'-dicarboxydiphenylether) 1,3,4-oxadiazole dianhydride
bis(3,4-dicarboxyphenyl)methane dianhydride
bis(3,4-dicarboxyphenyl)propane dianhydride.

The tetracarboxylic acids that are used are also those which correspond to the above dianhydrides.

The polyisocyanates which are made to react with the above carbonyl compounds are the same as those which are made to react during production of the polyamide-imides in solution and which are mentioned earlier.

When only diisocyanates are used as isocyanate group containing compounds in the production of the polyamide-imides and of the polyimides in solution that are resorted to in the method according to the present invention, the structure of the molecules of the resultant copolymer is linear. But if polyisocyanates are used in the production of at least one of these solutions, in addition to the diisocyanates, there are then obtained copolymers which are more or less cross-linked, depending on the proportions of polyisocyanate.

Cross-linking generally increases the heat and chemical resistance of the resulting resins but slightly decreases the flexibility of films made from these resins.

The polar inert organic solvents that are preferably used are N,N-dimethylacetamide, N,N-dimethylformamide, N-methyl-2-pyrrolidone and dimethylsulphoxide. Use can also be made of a mixture of these solvents or a mixture of these solvents with other inert solvents such as xylene, acetone and di- or triethylene glycol dimethyl ether.

The reaction temperature must not exceed 100° C. when it is desired to produce a copolymer in solution as the latter precipitates when heated beyond this temperature.

Following the reaction of the polyamide-imides and polyimides in solution, there is produced a copolymer in solution whose molecular weight is dependent on that of the polyamide-imides and of the polyimides that are made to react.

By heating this copolymer solution, spread on a plate, at a suitable temperature, possibly at a pressure below atmospheric, a film is obtained having both good mechanical properties, such as flexibility and tensile strength, and excellent resistance to heat.

The imide-amide copolymer in solution can also be precipitated by adding a non-solvent to the solution, so as to produce a copolymer powder which can be moulded under pressure to produce, after being heated at a suitable temperature and for a sufficient length of time, moulded bodies.

It must well be noted that although copolymers in solution having the above described structure and wherein the proportion of tetracarbonyl recurring units to tricarbonyl recurring units lower than 10 percent or higher than 90 percent may be of interest in certain uses, the effect of the combination of the high thermal resistance of polyimide and of the flexibility of polyamide-imide is only sufficiently apparent to justify using said copolymers instead of polyamide-imide or polyimide if said proportion is maintained in the above specified range.

The best results have been obtained, in the case when the tetracarbonyl recurring units are forwarded by pyromellitic dianhydride or diacid and when the tricarbonyl recurring unts are forwarded by trimellitic anhydride or acid, in the following range of relative proportions of said recurring units:

For linear copolymers: molar amount of tetracarbonyl units from 40.9 to 58.1 percent of the total number of recurring units.

For cross-linked copolymers: molar amount of tetracarbonyl units from 39.4 to 88.4 percent of the total number of recurring units.

The following examples further illustrate the invention:

EXAMPLE 1

45 g. of 4,4'-diphenylmethane diisocyanate and 34.5 g. (0.179 mole) of trimellitic monoanhydride are dissolved by stirring in 360 cc. of N-methyl-2-pyrrolidone kept at 80° C. and after dissolution, the temperature is progressively raised to 200° C. over a period of 7 hours. After cooling down the solution to 25° C., the latter has a viscosity of 250 centipoises.

In addition, 13 g. of 4,4'-diphenyl-1,1-cyclohexane diisocyanate and 8.930 g. (0.041 mole) of pyromellitic dianhydride are dissolved by stirring in 135 cc. of N,N-dimethyl-acetamide kept at 40° C. The resultant solution is poured into a cylinder, having a length of 500 cm. and a diameter of 5 cm., where it is stirred, by means of a "vibromixer," while at the same time bubbling nitrogen therein for 5 hours (at the rate of 60 litres/hour), the temperature being kept at 40° C. A slightly viscous solution is thus produced.

45 g. (i.e. an amount of solution containing 0.0179 mole trimellitic monoanhydride) of the first solution is then mixed with an equal quantity by weight (i.e. an amount corresponding to 0.0124 mole pyromellitic dianhydride) of the second solution and the mixture of these solutions is evaporated by heating it at 70° C. at a pressure of 15 mm. Hg until the viscosity of this mixture reaches 120 poises, without however giving the mixture the consistency of a gel. A layer of this viscous mixture of solutions is then spread on a glass plate whilst heating the latter to keep the temperature of this layer at 70° C. The temperature of the plate is then progressively raised to 130° C. over 4 hours at a pressure of 100 mm. Hg, whereupon the pressure is increased to atmospheric and the temperature is further raised progressively to 250° C. over 4 hours, whereafter this latter temperature is maintained during 4 hours. The plate and the film are then allowed to cool down until their temperature reaches ordinary temperature whereupon the resultant film is detached by dipping the plate in water.

EXAMPLE 2

30 g. (amount corresponding to 0.0119 mole trimellitic monoanhydride) of the first solution whose preparation is described in the previous example is mixed with 60 g. (corresponding to 0.0165 mole pyromellitic dianhydride) of the second solution of this example and a film is made as set forth in this example.

EXAMPLE 3

12 g. (corresponding to 0.00477 mole trimellitic monoanhydride) of the first solution of Example 1 is mixed with 120 g. of the second solution (corresponding to 0.03305 mole pyromellitic dianhydride) of this example by stirring for a new minutes at ambient temperature and a solution of 1 g. of triphenyl thiophosphate 4,4',4"-triisocyanate and of 0.7 g. (0.00321 mole) of pyromellitic dianhydride in 12 cc. of N,N-dimethylacetamide is then added to this mixture of solutions. The whole is stirred at ambient temperature for a few minutes and a film is made from this mixture of solutions as set forth in Example 1.

EXAMPLE 4

6 g. of 4,4'-diphenylether diisocyanate and 4.59 g. (0.0239 mole) of trimellitic monoanhydride are dissolved, while stirring, in 60 cc. of N-methyl-2-pyrrolidone kept at 80° C. and, once dissolved, the temperature is progressively raised over 7 hours to 200° C. so as to obtain a viscous solution.

In addition, 7 g. of 4,4'-diphenylether diisocyanate and 6.055 g. (0.0278 mole) of pyromellitic dianhydride are dissolved in 70 cc. of N',N-dimethylacetamide and this solution is poured into a container having a flat bottom of 600 cm.² in area which is maintained at 40° C. for two hours.

20 g. (amount containing 0.00661 mole trimellitic anhydride) of the first solution is mixed with an equal amount by weight of the second solution (corresponding to 0.00705 mole pyromellitic dianhydride) and a film is then made as set forth in Example 1.

This film, upon being heated for 63 hours at 300° C., in the atmosphere, loses 3.5% of its initial weight; this is comparable to the loss in weight (3.2%) under the same conditions, of a film of polyimide produced by reacting 4,4'-diphenylether diisocyanate with pyromellitic dianhydride. The resistance to folding of this film is good, even after the above-mentioned 63-hour heating operation at 300° C., whereas the polyamide-imide film produced by reacting 4,4'-diphenylether diisocyanate and trimellitic monoanhydride become brittle under these conditions.

The following table sets forth the resistance to heat, expressed in terms of the relative loss in weight of a sample kept at 300° C. in air for different lengths of time.

| Sample | Percent loss in weight by heating at 300° C. in air for— | | | Resistance to repeated folding through 180° after heating for 63 hrs. at 300° C. |
|---|---|---|---|---|
| | 63 hrs. | 100 hrs. | 220 hrs. | |
| According to the present example. | 3.5 | 4.5 | 8.2 | Good. |
| Polydiphenylether pyromellitimide. | 3.2 | 4.5 | 9.0 | Do. |
| Polydiphenylether-trimellitamide-imide. | 5.7 | 7.4 | 16.4 | Bad. |

The mechanical properties of this film are as shown in the following table:

| At 22° C. | | At 200° C. | |
|---|---|---|---|
| Tensile strength (in kg./mm.$^2$) | Elongation at rupture (percent) | Tensile strength (kg./mm.$^2$) | Elongation at rupture (percent) |
| 12.1 | 7.9 | 6.0 | 4.1 |

By thermogravimetric determination, with a thermoscale sold in the trade under the name of "Ugine-Eyraud" thermoscale, and by operating in air with a constant rate of temperature increase of 2.2° C./minute, a loss of weight was observed to begin to take place at 310° C.

EXAMPLE 5

10 g. of 4,4'-diphenylether diisocyanate, 1 g. of triphenyl methane 4,4',4''-triisocyanate and 8.17 g. (0.0425 mole) trimellitic monoanhydride are dissolved, while stirring, in 100 cc. of N-methylpyrrolidone kept at 80° C. After dissolution, the temperature is then raised to 100° C. and this temperature is maintained for 3 hours so that the solution becomes brown and viscous.

In addition, 15 g. of 4,4'-diphenylether diisocyanate, 1.5 g. of triphenyl methane 4,4',4''-triisocyanate and 14.3 g. (0.0666 mole) of pyromellitic dianhydride are dissolved, while stirring, in 150 cc. of N,N-dimethylacetamide kept at 40° C. and the resultant solution is poured into a container having a flat bottom of 1200 cm.$^2$ in area which is kept at 40° C. in an oven for two hours. A gelatinous collodion is produced which is poured in a flask wherein this collodion is heated for one hour at 100° C. while being energetically stirred so as to produce a non gelified brown viscous solution.

A film of copolymer is prepared by mixing 20 g. of each of the two solutions (corresponding, respectively, to 0.00695 mole trimellitic anhydride and 0.00775 pyromellitic dianhydride) and by adopting the same procedure as in Example 1.

This film has the following mechanical properties (the measurements being made at 22° C.).

Tensile strength, kg./mm.$^2$ _____ 10.1
Elongation at rupture (in relation to the initial length), percent _____ 10.3

At 200° C. the loss in tensile strength is 52% and the elongation at rupture increases by 186%.

By thermogravimetric determination under the same conditions as in Example 4, a loss of weight was observed to begin to take place at 320° C.

EXAMPLE 6

To a mixture consisting of 70 g. of each of the solution prepared in accordance with Example 4, i.e. the polyamide-imide solution and the polyimide solution (in amounts corresponding, respectively, to 0.02435 mole trimellitic anhydride and 0.0271 mole pyromellitic dianhydride) is added, while stirring at ambient temperature for 10 minutes, a solution of 1 g. of triphenylmethane 4,4',4''-triisocyanate and 0.9 g. (0.004125 mole) of pyromellitic dianhydride in 11 cc. of N,N-dimethylacetamide.

A film of copolymer is then made as in Example 1.

The mechanical properties of this film are as follows (the measurements being made at 22° C.).

Tensile strength, kg./mm.$^2$ _____ 11.01
Elongation at rupture (in relation to the initial length), percent _____ 13.9

At 200° C., the loss in tensile strength is 45% and the elongation at rupture increases by 67%.

EXAMPLE 7

To the first solution prepared in Example 4 (i.e. a polyamide-imide solution in amount corresponding to 0.0239 mole trimellitic anhydride), kept at 40° C., there is added, while stirring, a solution produced as follows:

3 g. of 4,4'-diphenylether diisocyanate and 2.07 g. (0.0095 mole) of pyromellitic dianhydride and 0.54 g. (0.00212 mole) of pyromellitic acid are dissolved in 45 cc. of N-dimethylacetamide and the solution is heated at 70° C. for 2 to 3 minutes to render it homogeneous. The solution is then poured into a container having a flat bottom of 600 cm.$^2$ in area and which is kept at 40° C. for 2 hours.

To the mixture of these two solutions, kept at 40° C., there is added, while stirring, over a period of 30 minutes, a solution of 1.2 g. of triphenyl thiophosphate 4,4', 4''-triisocyanate and 0.845 g. (0.00388 mole) of pyromellitic dianhydride in 20 cc. of N-dimethylacetamide.

A film is then made as in Example 1.

The resistance to heat of this film is similar to that of the film produced in accordance with Example 4.

EXAMPLE 8

A copolymer solution is made as set forth in Example 1, using both solutions whose preparations are described in this example, but with an amount of the first solution of this example corresponding to 0.018 mole trimellitic anhydride (i.e. 45.3 g. of solution) and an amount of the second solution corresponding to 0.002 mole pyromellitic dianhydride (i.e. 7.28 g. of solution). A film is then made as set forth in this example.

EXAMPLES 9–11

Copolymer solutions and films are made as set forth in Example 1, using both solutions whose preparations are described in this example, but with amounts of these solutions corresponding, respectively, to the following molar quantities of trimellitic anhydride and pyromellitic dianhydride:

| No. of the example | Molar amount of— | |
|---|---|---|
| | Trimellitic anhydride | Pyromellitic dianhydride |
| 9 | 0.015 | 0.005 |
| 10 | 0.005 | 0.015 |
| 11 | 0.002 | 0.018 |

EXAMPLES 12–15

Copolymer solutions and films are made as set forth in Example 6, using both solutions prepared in accordance with Example 4 and a solution of 1 g. of triphenylmethane-4,4',4''-triisocyanate and 0.9 g. of pyromellitic dianhydride in 11 cc. of N,N-dimethylacetamide, but with amounts of (1) polyamide-imide solution and (2) total amount of polyimide-solution and last mentioned solution corresponding, respectively, to the following total molar amounts of trimellitic anhydride and pyromellitic dianhydride.

| No. of the example | Molar amount of | |
|---|---|---|
| | Trimellitic anhydride | Pyromellitic dianhydride |
| 12 | 0.030 | 0.010 |
| 13 | 0.020 | 0.020 |
| 14 | 0.008 | 0.032 |
| 15 | 0.004 | 0.036 |

In the following table, the respective amounts of trimellitic anhydride and pyromellitic dianhydride and/or acid, used in the above examples are indicated in absolute and in relative values:

| No. of the example | Trimellitic anhydride (mole) | Pyromellitic dianhydride and/or pyromellitic acid (mole) | Trimellitic anhydride (mole percent) | Pyromellitic dianhydride and/or pyromellitic acid (mole percent) | Remarks [1] |
|---|---|---|---|---|---|
| 1 | 0.0179 | 0.0124 | 59.1 | 40.9 | L |
| 2 | 0.0119 | 0.0165 | 41.9 | 58.1 | L |
| 3 | 0.00477 | 0.03626 | 11.6 | 88.4 | CL |
| 4 | 0.00661 | 0.00705 | 48.8 | 51.6 | L |
| 5 | 0.00695 | 0.00775 | 47.3 | 52.7 | L |
| 6 | 0.02435 | 0.03122 | 43.8 | 56.2 | CL |
| 7 | 0.0239 | 0.0155 | 61.6 | 39.4 | CL |
| 8 | 0.018 | 0.002 | 90 | 10 | L |
| 9 | 0.015 | 0.005 | 75 | 25 | L |
| 10 | 0.005 | 0.015 | 25 | 75 | L |
| 11 | 0.002 | 0.018 | 10 | 90 | L |
| 12 | 0.030 | 0.010 | 75 | 25 | CL |
| 13 | 0.020 | 0.020 | 50 | 50 | CL |
| 14 | 0.008 | 0.032 | 20 | 80 | CL |
| 15 | 0.004 | 0.036 | 10 | 90 | CL |

[1] L=Linear copolymer; CL=Cross linked copolymer.

We claim:
1. A method of making an imide-amide copolymer, comprising (a) forming a mixture of
    (1) a solution obtained by reacting, in the presence of at least one polar inert organic solvent selected from the group consisting of N,N-dimethylacetamide, N,N-dimethylformamide, N-methyl-2-pyrrolidone and dimethylsulphoxide, at least one carbonyl compound which is capable of supplying both an amide and an internal imide and which contains a carboxyl group and a pair of carbonyl groups each linked on one side to a distinct carbon atom of one trivalent radical and on the other side to an oxygen atom, the two carbonyl groups being separated by at most three carbon atoms and the carboxyl group being separated from each of the carbonyl groups by at least two carbon atoms, with at least one diisocyanate or a mixture of at least one polyisocyanate and of at least one diisocyanate, the quantities of diisocyanate, of polyisocyanate and of carbonyl compound being such that for each NCO group there is a corresponding ½ mole of carbonyl compound,
    (2) a solution obtained by reacting, in the presence of at least one polar inert organic solvent selected from the group consisting of N,N - dimethylacetamide, N,N - dimethylformamide, N,N - methyl - 2-pyrrolidone and dimethylsulphoxide, at least one tetracarbonyl compound which is capable of supplying an internal diimide and which contains two pairs of carbonyl groups, each of these groups being linked on one side to a carbon atom of one tetravalent radical and on the other side to an oxygen atom, the carbonyl groups belonging to one pair being separated by at most three carbon atoms, with at least one diisocyanate or a mixture of at least one polyisocyanate with at least one diisocyanate, the quantities of diisocyanate, of polyisocyanate and of carbonyl compound being such that, for each NCO group, there is a corresponding ½ mole of carbonyl compound, and/or (3) a mixture of the starting products of solution (2), wherein the mixture contains from 10 to 90 percent of tetracarboxylic compound, based on the total number of moles of tricarboxylic and tetracarboxylic compounds,
and (b) leaving said mixture to react at a temperature of less than 100° C. to produce said copolymer in solution, said tetracarbonyl compound being a tetracarboxylic acid dianhydride selected from the group consisting of pyromellitic dianhydride, cyclopentadienyl tetracarboxylic dianhydride 3,4,3',4' - benzophenone tetracarboxylic dianhydride, bis, 2,5 - (3',4' - dicarboxyphenyl) 1,3,4-oxadiazole dianhydride and 1,4,5,8 - naphthalene tetracarboxylic dianhydride.

2. A method of making an imide-amide copolymer, comprising (a) forming a mixture of
    (1) a solution obtained by reacting, in the presence of at least one polar inert organic solvent selected from the group consisting of N,N-dimethylacetamide, N,N-dimethylformamide, N-methyl - 2 - pyrrolidone and dimethylsulphoxide, at least one carbonyl compound which is capable of supplying both an amide and an internal imide and which contains a carboxyl group and a pair of carbonyl groups each linked on one side to a distinct carbon atom of one trivalent radical and on the other side to an oxygen atom, the two carbonyl groups being separated by at most three carbon atoms and the carboxyl group being separated from each of the carbonyl groups by at least two carbon atoms, with at least one diisocyanate or a mixture of at least one polyisocyanate and of a least one diisocyanate, the quantities of diisocyanate, of polyisocyanate and of carbonyl compound being such that for each NCO group there is a corresponding ½ mole of carbonyl compound,
    (2) a solution obtained by reacting, in the presence of at least one polar inert organic solvent selected from the group consisting of N,N-dimethylacetamide, N,N-dimethylformamide, N-methyl - 2 - pyrrolidone and dimethylsulphoxide, at least one tetracarbonyl compound which is capable of supplying an internal diimide and which contains two pairs of carbonyl groups, each of these groups being linked on one side to a carbon atom of one tetravalent radical and on the other side to an oxygen atom, the carbonyl groups belonging to one pair being separated by at most three carbon atoms, with at least one diisocyanate or a mixture of at least one polyisocyanate with at least one diisocyanate, the quantities of diisocyanate, of polyisocyanate and of carbonyl compound being such that, for each NCO group, there is a corresponding ½ mole of carbonyl compound, and/or (3) a mixture of the starting products of solution (2), wherein the mixture contains from 10 to 90 percent of tetracarboxylic compound, based on the total number of moles of tricarboxylic and tetracarboxylic compounds,
and (b) leaving said mixture to react at a temperature of less than 100° C. to produce said copolymer in solution, said tetracarbonyl compound being a tetracarboxylic acid selected from the group consisting of pyromellitic acid, 3,4,3',4'-benzophenone tetracarboxylic acid, bis 2,5'-(3',4'-dicarboxyphenyl) 1,3,4-oxadiazole-1,3,4 and cyclopentadienyl tetracarboxylic acid.

3. A method as claimed in claim 2 wherein said carbonyl compound which is capable of supplying both an amide and an internal imide is a tricarboxylic acid monoanhydride of the general formula

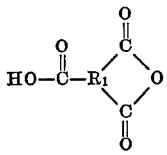

wherein $R_1$ is a trivalent organic radical including at least three carbon atoms selected from the group consisting of an ethylene radical, an alkyl radical, an aryl radical, a cycloalkyl radical, two aryl radicals bonded to each other directly or through one of the following radicals:

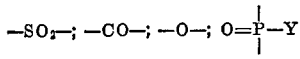

where Y is an alkyl, aryl or cycloalkyl radical or a hydrogen atom, or else through at least one heterocyclic radical containing at least one nitrogen, oxygen or sulfur atom.

4. A method as claimed in claim 3 wherein said monoanhydride is at least one of the following monoanhydrides; trimellitic monoanhydride, 1,2,4-cyclopentadienyl tricarboxylic 1,2-monoanhydride, 3,4,4'-diphenylether tricarboxylic 3,4-monoanhydride, 2-(3',4'-dicarboxyphenyl) 5-(3'-carboxyphenyl) 1,3,4 - oxadiazole 3',4' - monoanhydride and 1,8,4-naphthalene tricarboxylic 1,8-monoanhydride.

5. A method as claimed in claim 2 wherein said carbonyl compound which is capable of supply both an amide and an internal imide is a tricarboxylic acid corresponding to the general formula

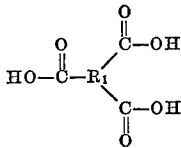

wherein $R_1$ is as defined above.

6. A method as claimed in claim 5 wherein said tricarboxylic acid is at least one of the following acids: trimellitic acid, 3,4,4'-diphenylether tricarboxylic acid, 2-(3', 4'-dicarboxyphenyl) 5-(3'-carboxyphenyl) 1,3,4-oxadiazole and 1,2,4-cyclopentadienyl tricarboxylic acid.

7. A method as claimed in claim 2 wherein said diisocyanate is a diisocyanate of general formula

O=C=N—R—N=C=O wherein R is selected from the group consisting of an alkyl radical, an aryl radical, a cycloalkyl radical, two cycloalkyl radicals directly bonded to each other, two aryl radicals bonded to each other directly or through one of the following radicals:

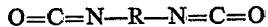

where Y is an alkyl, aryl or cycloalkyl radical or a hydrogen atom, or else through at least one heterocyclic radical containing at least one nitrogen, oxygen or sulfur atom.

8. A method as claimed in claim 7 wherein said diisocyanate is at least one of the following diisocyanates: hexamethylene diisocyanate, dodecamethylene diisocyanate, 4,4'-diphenylmethane diisocyanate, 4,4'-diphenylether diisocyanate, tolylene diisocyanate, bis(para-phenylene isocyanate) 1,3,4-oxadiazole, 4,4'-diphenyl-1,1-cyclohexane diisocyanate and 4,4'-diphenyl-2,2'-propane diisocyanate.

9. A method as claimed in claim 2 wherein said polyisocyanate is a polyisocyanate of the general formula R'(—N=C=O)$_n$ wherein n is 3 or 4, R' is an n-valent organic radical, including at least n carbon atoms, selected from the group consisting of an alkyl radical, an aryl radical, a cycloalkyl radical, or two, three or four aryl radicals bonded to one another directly or through one of the following radicals:

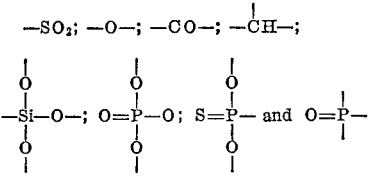

10. A method as claimed in claim 9 wherein said polyisocyanate is a triisocyanate.

11. A method as claimed in claim 10 wherein said triisocyanate is at least one of the following triisocyanates: triphenylmethane 4,4',4" - triisocyanate, triphenyl phosphate 4,4',4"-triisocyanate, and triphenyl thiophosphate 4,4',4"-triisocyanate.

12. A method as claimed in claim 9 wherein said polyisocyanate is 4,4'-dimethyl diphenyl methane 2,2',5,5'-tetraisocyanate.

13. A method as claimed in claim 9 wherein said polyisocyanate is a polyphenylene polymethylene polyisocyanate.

14. A method as claimed in claim 2, which comprises spreading said imide-amide copolymer in solution on a support to form thereon a thin layer and heating said layer to a temperature at least equal to the boiling temperature of the solvent, maintaining this temperature for the length of time that is necessary to achieve complete evaporation of the solvent, then raising the temperature to above 200° C. and maintaining this temperature for the length of time that is necessary to produce a solid film.

15. A method as claimed in claim 2, which comprises adding to said copolymer in solution a non-solvent to thereby precipitate the copolymer in the form of a powder.

16. A method as claimed in claim 1, wherein said carbonyl compound which is capable of supplying both an amide and an internal imide is a tricarboxylic acid monoanhydride of general formula

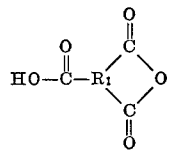

wherein $R_1$ is a trivalent organic radical including at least three carbon atoms selected from the group consisting of an ethylene radical, an alkyl radical, an aryl radical, a cycloalkyl radical, two aryl radicals bonded to each other directly or through one of the following radicals:

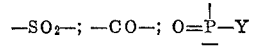

where Y is an alkyl, aryl or cycloalkyl radical or a hydrogen atom, or else through at least one heterocyclic radical containing at least one nitrogen, oxygen or sulfur atom.

17. A method as claimed in claim 16, wherein said monoanhydride is a tleast one of the following monoanhydrides: trimellitic monoanhydride, 1,2,4 - cyclopentadienyl tricarboxylic 1,2 - monoanhydride, 3,4,4'-diphenyl-ether tricarboxylic 3,4 - monoanhydride, 2-(3',4'-dicarboxyphenyl) 5 - (3'-carboxyphenyl) 1,3,4 - oxadiazole, 3',4'-monoanhydride and 1,8,4-naphthalene tricarboxylic 1,8-monoanhydride.

18. A method as claimed in claim 1, wherein said carbonyl compound which is capable of supplying both an amide and an internal imide is a tricarboxylic acid corresponding to the general formula

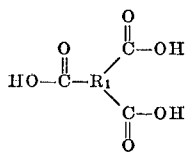

wherein $R_1$ is as defined above.

19. A method as claimed in claim 18, wherein said tricarboxylic acid is at least one of the following acids: trimellitic acid, 3,4,4'-diphenylether tricarboxylic acid, 2-(3',4' - dicarboxyphenyl) 5-(3'-carboxyphenyl) 1,3,4-oxadiazole and 1,2,4-cyclopentadienyl tricarboxylic acid.

20. A method as claimed in claim 1, wherein said diisocyanate is a diisocyanate of general formula $$O=C=N-R-N=C=O$$

wherein R is selected from the group consisting of an alkyl radical, an aryl radical, a cycloalkyl radical, two cycloalkyl radicals directly bonded to each other, two aryl radicals bonded to each other directly or through one of the following radicals:

where Y is an alkyl, aryl or cycloalkyl radical or a hydrogen atom, or else through at least one heterocyclic radical containing at least one nitrogen, oxygen or sulfur atom.

21. A method as claimed in claim 20, wherein said diisocyanate is at least one of the following diisocyanates: hexamethylene diisocyanate, dodecamethylene diisocyanate, 4,4'-diphenylmethane diisocyanate, 4,4'-diphenylether diisocyanate, tolylene diisocyanate, bis(para-phenylene isocyanate) 1,3,4-oxadiazole, 4,4'-diphenyl-1,1-cyclohexane diisocyanate and 4,4'-diphenyl-2,2'-propane diisocyanate.

22. A method as claimed in claim 1, wherein said polyisocyanate is a polyisocyanate of the general formula $$R'(-N=C=O)_n$$

wherein $n$ is 3 or 4, R' is an n-valent organic radical, including at least $n$ carbon atoms, selected from the group consisting of an alkyl radical, an aryl radical, a cycloalkyl radical, or two, three or four aryl radicals bonded to one another directly or through one of the following radicals:

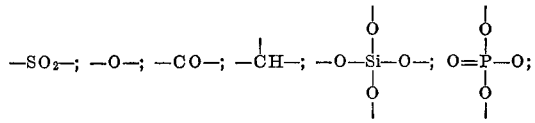

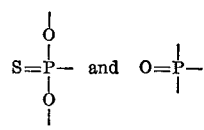

23. A method as claimed in claim 22, wherein said polyisocyanate is a triisocyanate.

24. A method as claimed in claim 23, wherein said triisocyanate is at least one of the following triisocyanates: triphenylmethane 4,4',4''-triisocyanate, triphenyl phosphate 4,4',4''-triisocyanate, and triphenyl thiophosphate 4,4',4''-triisocyanate.

25. A method as claimed in claim 22, wherein said polyisocyanate is 4,4'-dimethyl diphenyl methane 2,2',5,5'-tetraisocyanate.

26. A method as claimed in claim 22, wherein said polyisocyanate is a polyphenylene polymethylene polyisocyanate.

27. A method as claimed in claim 1, which comprises spreading said imide-amide copolymer in solution on a support to form thereon a thin layer and heating said layer to a temperature at least equal to the boiling temperature of the solvent, maintaining this temperature for the length of time that is necessary to achieve complete evaporation of the solvent, then raising the temperature to above 200° C. and maintaining this temperature for the length of time that is necessary to produce a solid film.

28. A method as claimed in claim 1, which comprises adding to said copolymer in solution a non-solvent to thereby precipitate the copolymer in the form of a powder.

References Cited
UNITED STATES PATENTS

| | | | |
|---|---|---|---|
| 3,440,197 | 4/1969 | Boldebuck | 260—78 TF |
| 3,541,038 | 11/1970 | Nakano | 260—30.6 N |
| 3,407,176 | 10/1968 | Loncrini | 260—78 TF |
| 3,560,426 | 2/1971 | Adesko | 260—78 TF |
| 3,562,217 | 2/1971 | Zalewski | 260—78 TF |
| 3,661,852 | 5/1972 | Flowers | 260—78 TF |
| 3,493,540 | 2/1970 | Muller | 260—32.8 N |

MORRIS LIEBMAN, Primary Examiner

P. R. MICHL, Assistant Examiner

U.S. Cl. X.R.

260—30.8 DS, 32.6 NT, 78 TF, 857 PI